US007369943B2

(12) United States Patent
Adams

(10) Patent No.: US 7,369,943 B2
(45) Date of Patent: May 6, 2008

(54) POWERED MOBILITY VEHICLE COLLISION DAMAGE PREVENTION DEVICE

(76) Inventor: Don L. Adams, P.O. Box T, Tulia, TX (US) 79088

( * ) Notice: Subject to any disclaimer, the term of this patent is extended or adjusted under 35 U.S.C. 154(b) by 0 days.

(21) Appl. No.: 11/637,434

(22) Filed: Dec. 12, 2006

(65) Prior Publication Data

US 2007/0093963 A1 Apr. 26, 2007

Related U.S. Application Data

(62) Division of application No. 10/834,692, filed on Apr. 29, 2004, now abandoned.

(60) Provisional application No. 60/466,320, filed on Apr. 29, 2003.

(51) Int. Cl.
*G06F 17/10* (2006.01)

(52) U.S. Cl. .................. 701/301; 280/250.1; 180/907; 340/435

(58) Field of Classification Search ................ 701/301; 280/250.1; 180/907; 340/435
See application file for complete search history.

(56) References Cited

U.S. PATENT DOCUMENTS

| | | | | |
|---|---|---|---|---|
| 6,108,592 | A * | 8/2000 | Kurtzberg et al. | 701/1 |
| 6,409,196 | B1 * | 6/2002 | McFarland | 280/250.1 |
| 6,655,503 | B1 * | 12/2003 | Moody | 188/2 F |
| 6,842,692 | B2 * | 1/2005 | Fehr et al. | 701/200 |
| 7,204,328 | B2 * | 4/2007 | LoPresti | 180/6.5 |
| 2004/0006422 | A1 * | 1/2004 | Fehr et al. | 701/200 |
| 2004/0220735 | A1 * | 11/2004 | Adams | 701/301 |
| 2005/0173888 | A1 * | 8/2005 | Stamps et al. | 280/250.1 |
| 2007/0093963 | A1 * | 4/2007 | Adams | 701/301 |

* cited by examiner

*Primary Examiner*—Thomas Black
*Assistant Examiner*—Wae Lenny Louie
(74) *Attorney, Agent, or Firm*—Aaron R. Clements; Hurley & Guinn

(57) ABSTRACT

A collision damage prevention system is disclosed which may be installed on many standard powered mobility vehicles for handicapped persons. The system includes an array of one or more sensors placed around the periphery of the powered mobility vehicle, a switch for each sensor, and a central control module which receives input from the switches, turns the vehicle off and/or applies braking power to prevent damage from a collision. The system then prompts the operator to acknowledge the collision and guides the operator into the appropriate direction to move the vehicle's controls in order to move away from the object collided with.

1 Claim, 7 Drawing Sheets

1

POWERED MOBILITY VEHICLE COLLISION DAMAGE PREVENTION DEVICE

CROSS REFERENCE TO RELATED APPLICATIONS

Reference is hereby made to provisional application number 60/466,320, filed on Apr. 29, 2003, and to utility application number 10/834,692 filed Apr. 29, 2004, now abandoned of which this application is a divisional, from which priority is hereby claimed pursuant to 35 U.S.C. §120.

STATEMENT REGARDING FEDERALLY SPONSORED RESEARCH

Not Applicable.

REFERENCE TO "MICROFICHE APPENDIX"

Not Applicable.

BACKGROUND OF THE INVENTION

This Invention relates to a device and method for preventing damage from collisions occurring during the operation of a powered wheelchair or similar mobility device. Powered wheelchairs and similar powered mobility devices are self-powered vehicles which are commonly used by handicapped individuals to give them mobility, most particularly within the confines of the individual's home or within businesses the individual visits. These vehicles have greatly enhanced the lives of those affected by disease, stroke, injury, or the ravages of aging; however, the typical user is often restricted in head movement, visual and auditory acuity, and other sensory perception (including vibration) such that it becomes impossible for the typical user to adequately observe the boundaries of the vehicle as the user maneuvers among furniture, around corners, and through doors of the home or business. It is very common for these vehicles to cause severe damage to their surroundings, even when maneuvered at very low speeds, because of the great power capabilities of these vehicles necessary to overcome slopes, door thresholds, and other obstacles in normal use. It is especially common for a person with hearing difficulties, upon colliding with a door frame or piece of furniture, to continue to apply power in the same direction, rather than to ease the mobility device away from the object. The result is that severe damage often results from these collisions, both to the object collided with as well as the vehicle, with deep scratches, gouges, and holes left in the former, or bent operating handles and other damage done to the latter. Problems are not limited to those with hearing difficulties, however; even for those who realize that a collision has occurred, the controls of common mobility devices are often counterintuitive regarding the direction the user needs to move to avoid damage. A need therefore exists for a system which will detect an impending collision between a handicapped mobility device and an object which will stop the mobility device from causing damage to the object, alert the user to the impending collision, and guide the user towards making appropriate course modifications to prevent damage to the mobility device and the object.

The present Invention is therefore directed remedying these problems by providing a device and method for modifying an existing powered mobility device which, when installed on such a powered mobility device, will detect an

2 impending collision, will prevent damage to the object collided with and will alert the user by stopping the vehicle and/or sounding an alarm, and will give the user guidance on the appropriate corrective action to take before the object is damaged.

SUMMARY OF THE DISCLOSURE

In accordance with the present Invention, a peripheral sensor system having a tape switch or bumper switch or similar device is attached to the outer periphery of the powered mobility device. The peripheral sensor system includes the tape switch, bumper switch, or similar switch as described, which is mounted to a sensor support framework, plus an electronic control module which interfaces with the power control of the powered mobility device on which the Invention is installed. The sensor support framework consists essentially of a bumper mounted to the vehicle by means of existing bolts and is made from spring steel or other resilient, damage resistant material. The electronic control module further includes a reset timer and an output panel with a series of light-emitting diodes or similar lighting devices. Upon contact with an object, the tape switch or bumper switch closes, energizing the electronic control module which then shuts down the vehicle, displays a light to alert the user that a collision has occurred, further displays a light to alert the user as to what corrective action needs to be taken to prevent damage, and starts the reset timer, which will automatically reset the system after a predetermined delay period.

DETAILED DESCRIPTION OF THE PREFERRED EMBODIMENT

Figure 1:
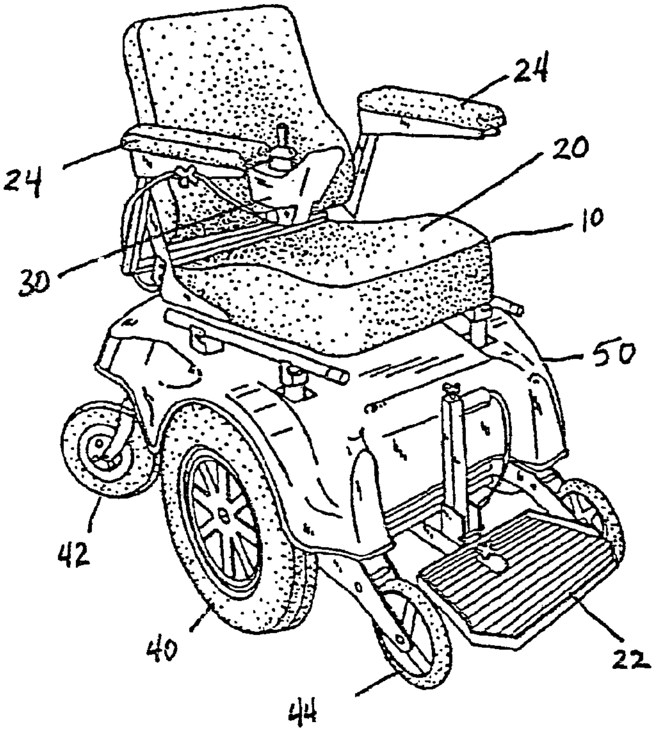
FIG. 1 shows a typical powered mobility vehicle in oblique view.
Figure 2:
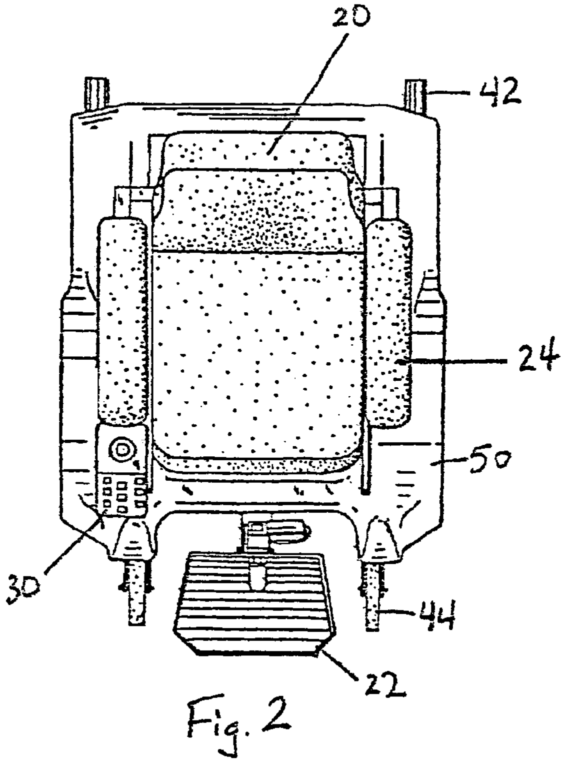
FIG. 2 shows a top view of a typical powered mobility vehicle.

FIGS. 1 and 2 show a typical powered mobility vehicle 10. Such a vehicle has a seat 20, footrest 22, and armrests 24 to accommodate the user. Mounted to one of the armrests 24 is a steering control module 30 with which the user operates the vehicle. The seat 20 and footrest 22 are mounted to the body 50, which houses the unit's battery and motor. The vehicle additionally has a plurality of wheels, typically a pair of main drive wheels 40, a pair of rear steering wheels 42, and a set of forward wheels 44. The latter may or may not be utilized in steering the vehicle during its operation.

Figure 3:
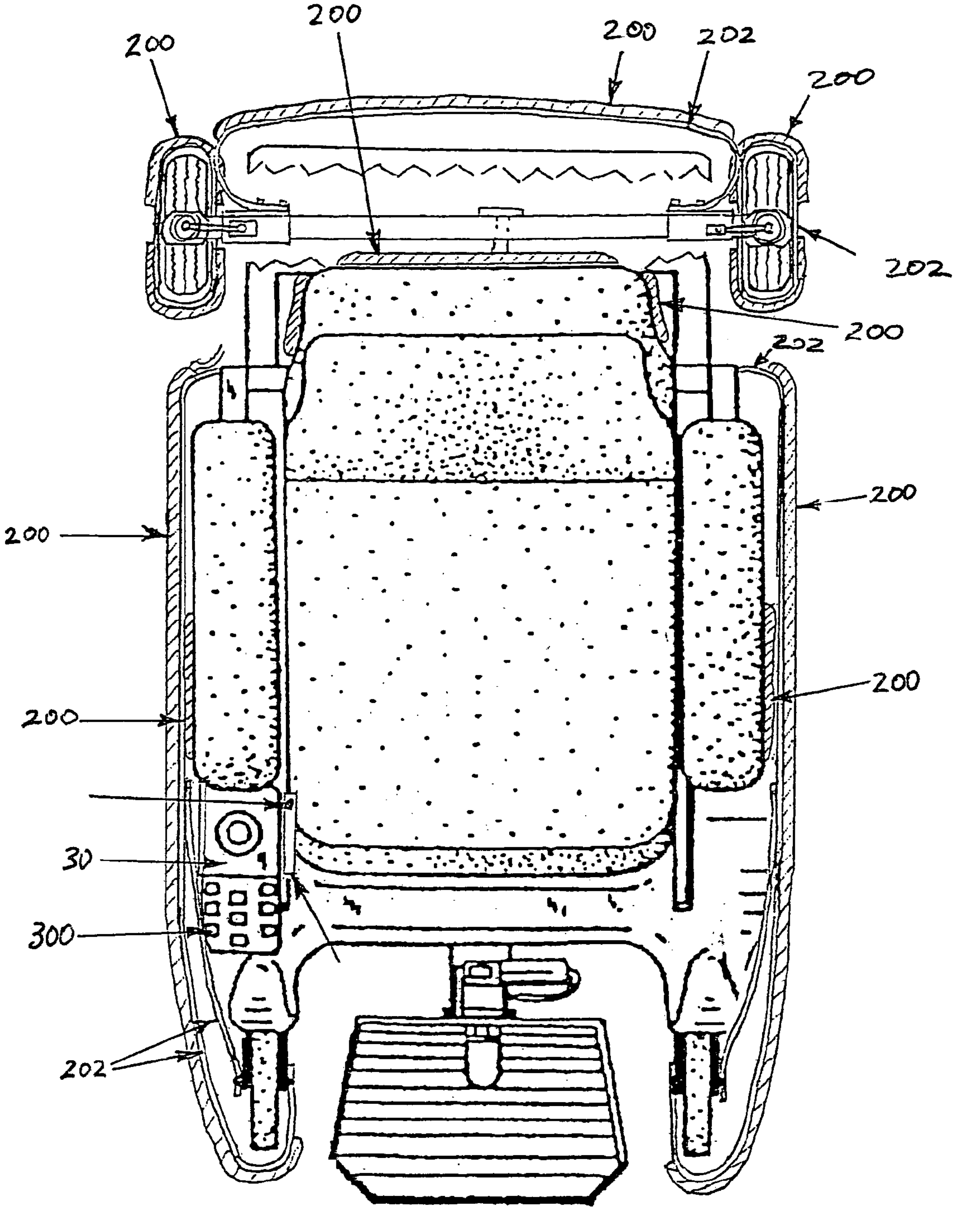
FIG. 3 shows a top view of a typical mobility vehicle with the collision damage prevention system installed.
Figure 4:
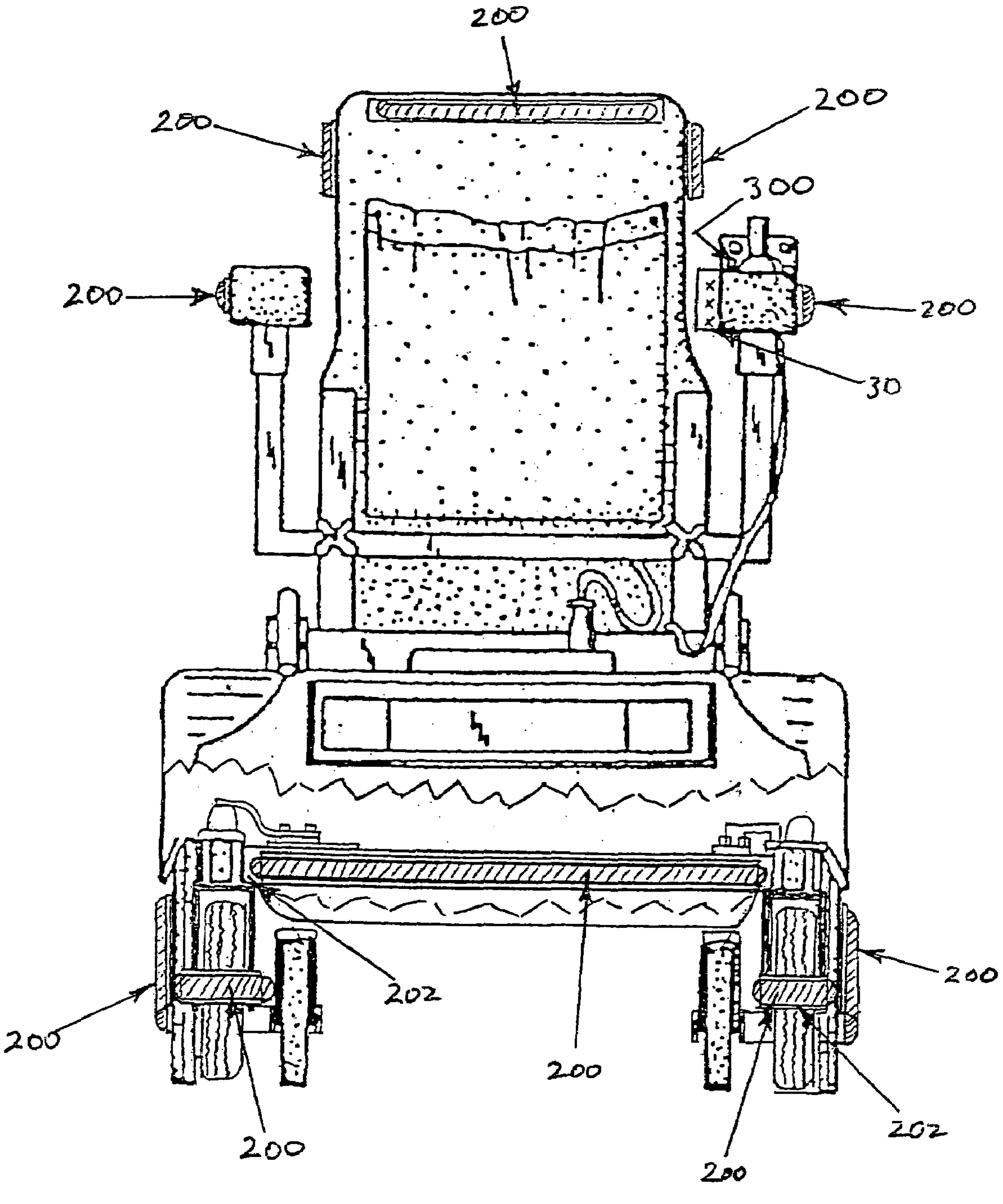
FIG. 4 shows a rear view of a typical mobility vehicle with the collision damage prevention system installed.
Figure 5:
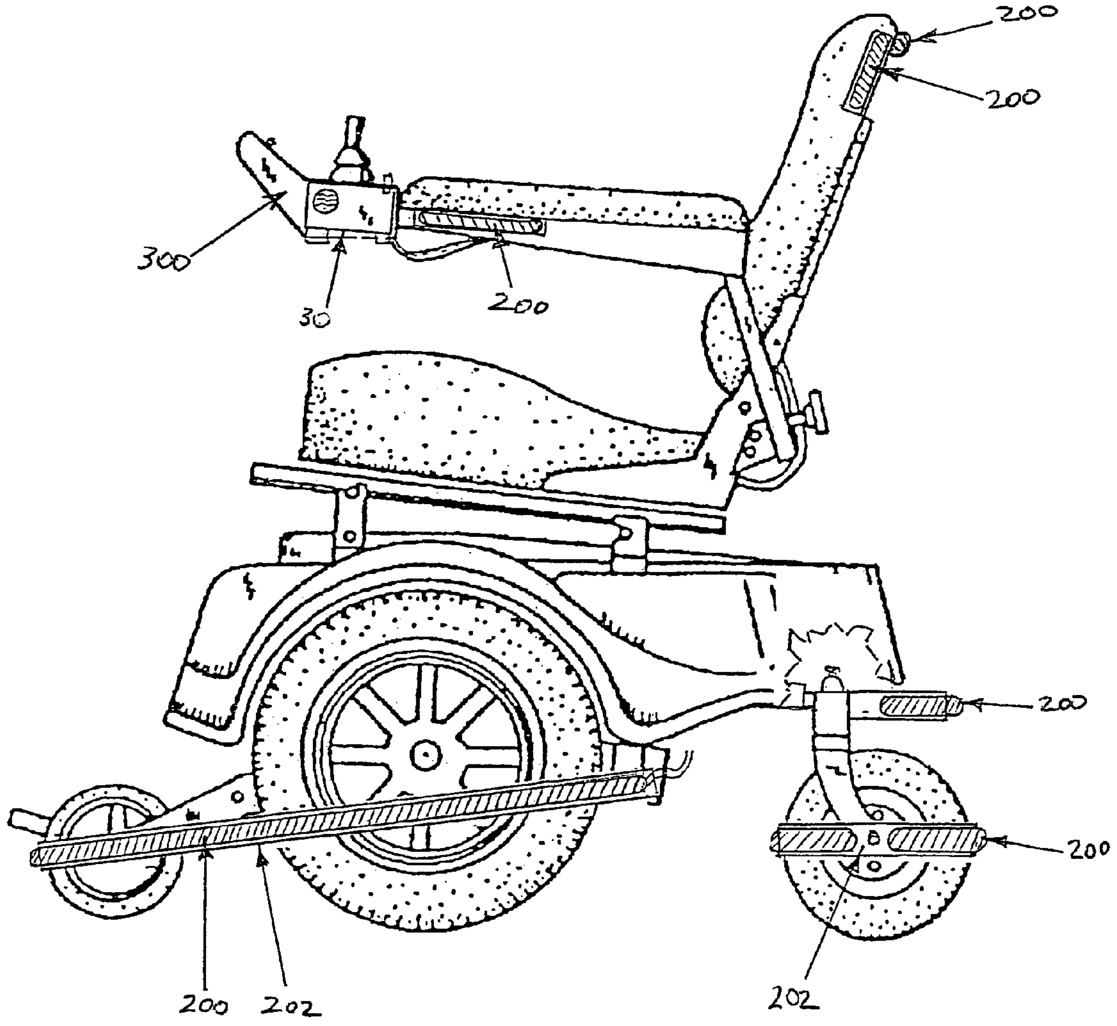
FIG. 5 shows a left side view of a typical mobility vehicle with the collision damage prevention system installed.
Figure 6:
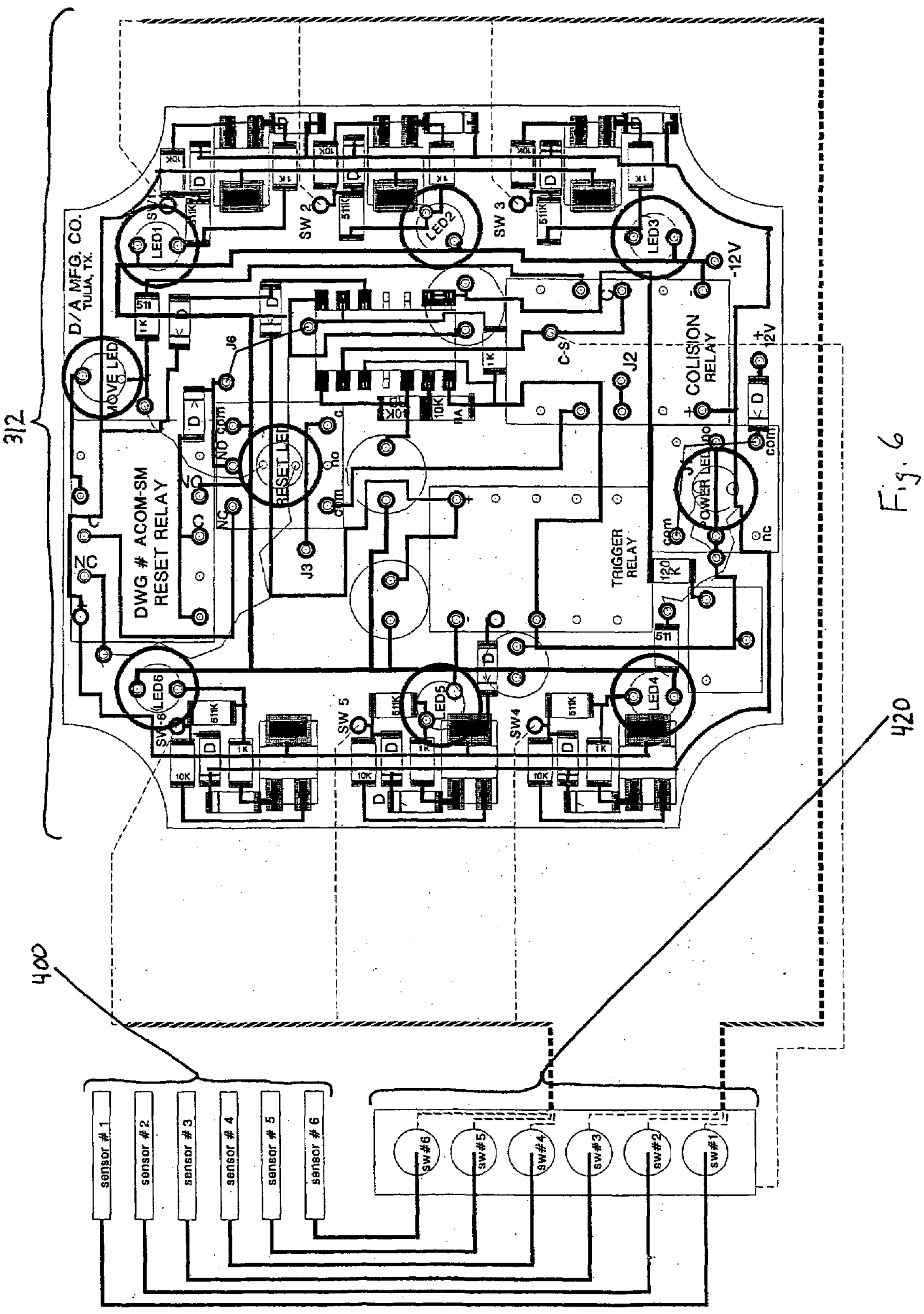
FIG. 6 shows a conceptualization of the connections between major components of the collision damage prevention system.
Figure 7:
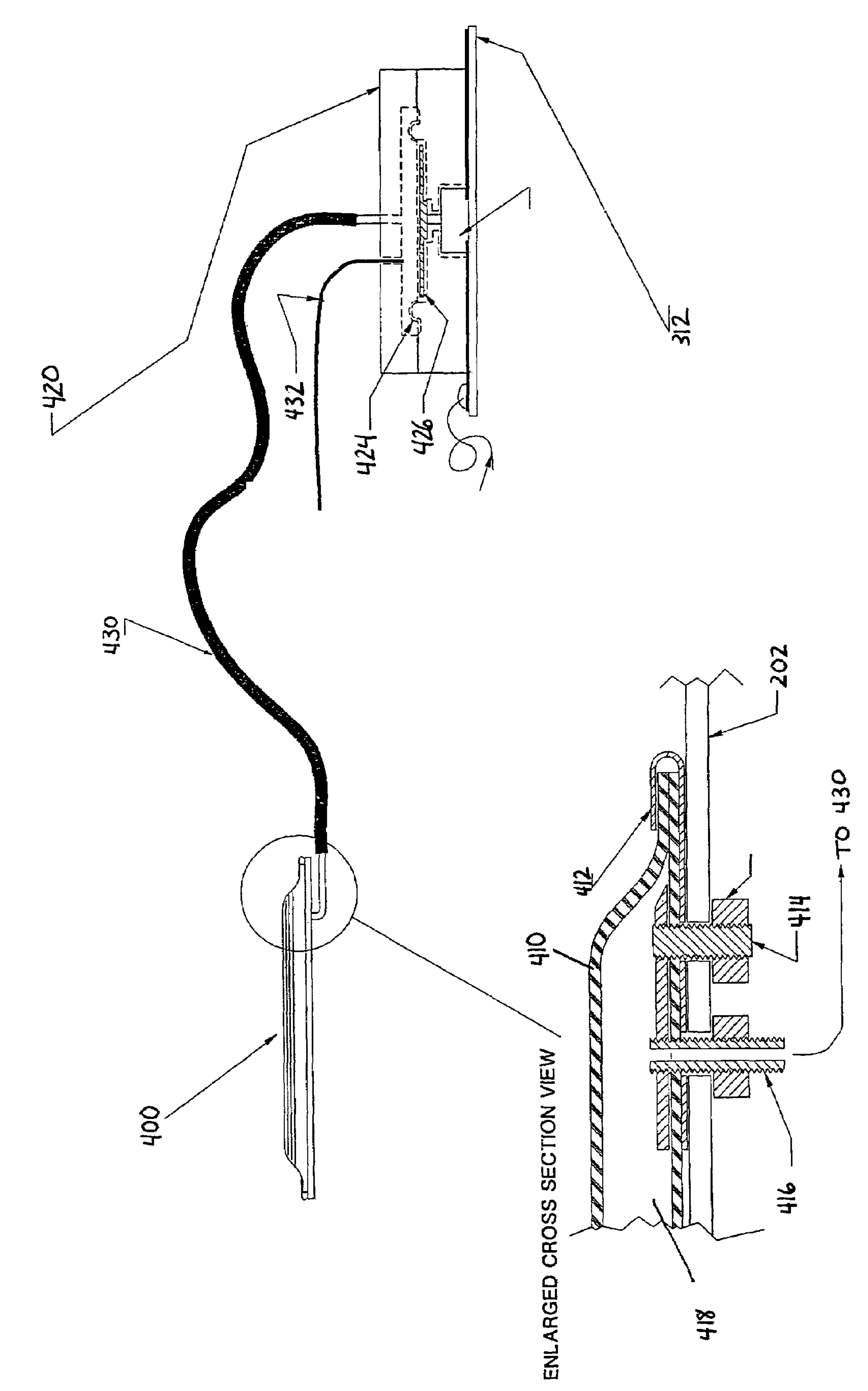
FIG. 7 shows a detailed cross-sectional view of the pneumatic sensors and sensor switches.
Figure 8:
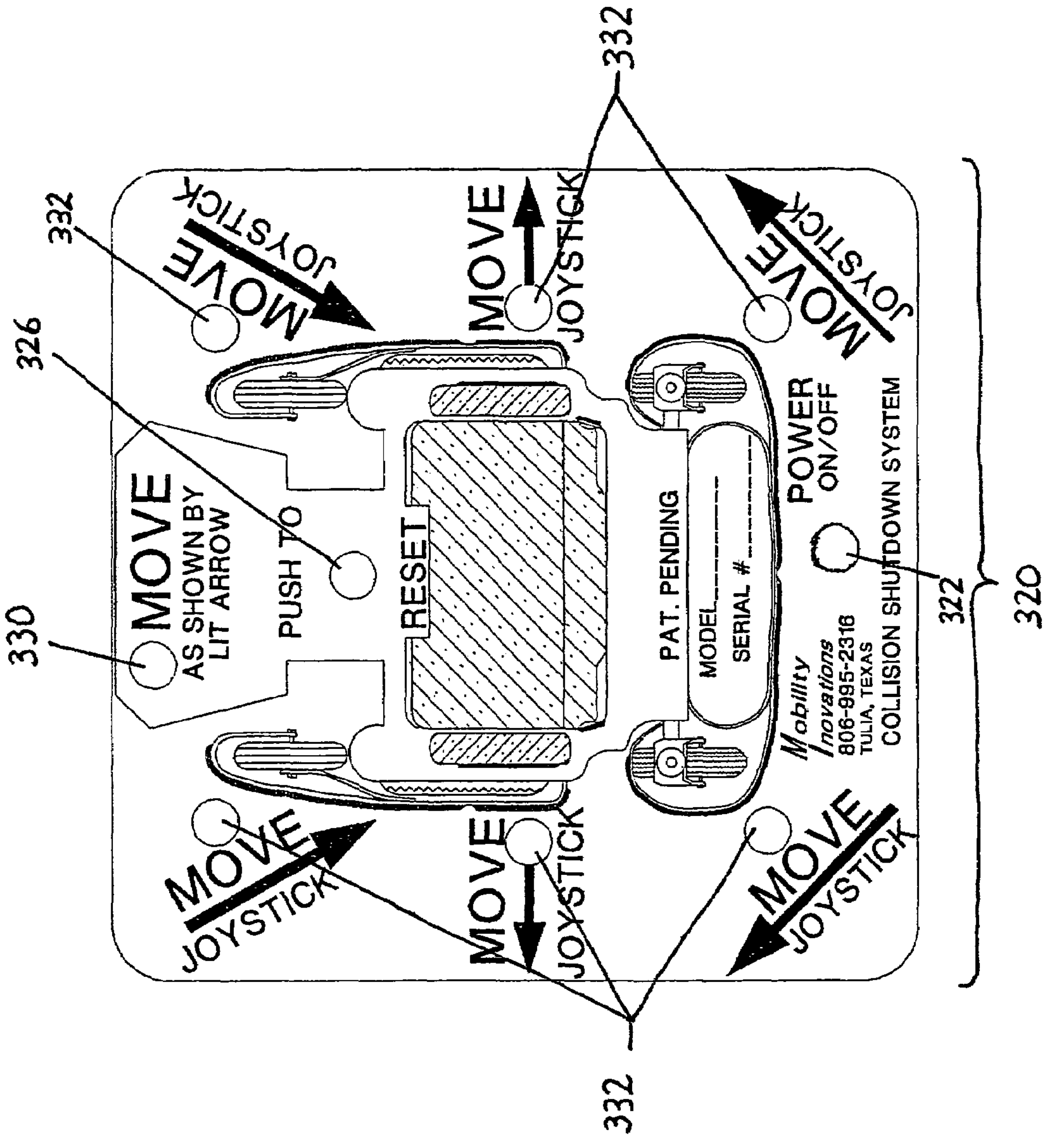
FIG. 8 shows the preferred input/output user interface.

FIGS. 3, 4, and 5 disclose a typical powered mobility vehicle 10 with the collision damage prevention system 100 installed. Around the periphery of the vehicle 10, a sensor support framework 202 (made of spring steel or similar resilient, semiflexible material that is damage resistant) is mounted, to which a plurality of sensors 200 (preferably six) are installed. It will be understood that due to the nature of the modular design of the sensors 200, the number of sensors can be varied from as few as one to as many as needed. These sensors 200 may be tape or ribbon switches (which will be understood by those with ordinary skill in the art), but preferably comprise a pneumatic sensor and switch system described in further detail, infra. Referring to FIGS. 6, 7, and 8, each of the sensors 200 is connected to a central control module 300, which is interfaced with the powered mobility vehicle's user steering control module 30. The central control module 300 includes electronic circuitry 310 for monitoring the status of the various sensors 200. Those of ordinary skill in the art will understand how to build the necessary circuitry to accomplish the tasks needed. The central control module 300 also includes a user input/output interface 320 for communicating with the user of the powered mobility vehicle 10. This user input/output interface 320 includes an on/off switch 322, which is backlit by an on/off switch light-emitting diode (LED) 324; a reset switch 326, which is similarly backlit by a reset switch LED 328; a collision alarm LED 330; and a plurality of directional instruction LED's 332. The face of the input/output interface 320 further includes a number of preprinted instructions, particularly including preprinted instructions on the direction to move the steering apparatus of the powered mobility vehicle 10 to correct for a collision. The directional instruction LED's 332 are arranged on the face of the input/output interface 320 around the periphery of a silhouette of the powered mobility vehicle 10 such that one directional instruction LED 332 is associated with a particular sensor 200; for example, in a system with a sensor on the left front of the vehicle 10, a directional instruction LED 332 is included in the input/output interface 320. The on/off switch 322 may be used to turn the collision damage prevention system 100 on and off independently from the powered mobility vehicle 10. This is a safety feature that allows a user to override the system in the event of an emergency requiring a user to evacuate a building. When the system is on, the on/off switch LED 324 is also on, indicating to the user that there is power to the collision damage prevention system 100.

The preferred sensor in this arrangement is a pneumatic sensor, both due to cost and ease of use considerations. Referring particularly to FIG. 7, a pneumatic sensor 400 consists of a formed rubber bumper 410 made from two superposed layers of rubber sealed at the edge by a sensor end cap 412, which also serves to protect the edge of the rubber bumper 410. The two layers of the pneumatic sensor 400 define a pneumatic cavity 418. This assembly is mounted to the sensor support framework 202 by means of one or more set screws 414 and a hollow set screw 416. The hollow set screw 416 is simply a screw with a hole passing through the long axis of the screw, causing the two ends of the screw to be in fluid communication. The hollow set screw 416 passes through one layer of the rubber bumper 410. By this arrangement, the pneumatic cavity 418 is in fluid communication with a connecting tubing 430, which is connected at one end to the hollow set screw 416 an at the other end to a pneumatic switch 420. The pneumatic switch 420 includes a switch body 422, a switch diaphragm 424, a switch actuator plate 426, and a capillary tube 432.

In operation, when the rubber bumper 410 contacts an object, the deformation of the bumper causes an increase in the air pressure within the bumper. This pressure is communicated through the hollow set screw 416 and connecting tubing 430 to the switch diaphragm 424, depressing the diaphragm. As the diaphragm 424 is depressed, it operates upon the switch actuator plate 426, thus tripping the switch 420 and closing the circuit, which thus alerts the central control module 300 that a collision has occurred. The capillary tube 432 provides a route for a controlled release or leakage of air pressure from within the pneumatic sensor 400, thereby allowing the system to self-compensate for gradual variations in air pressure due to a variety of non-collision circumstances, including heating of the pneumatic sensor 400 (either due to exposure to sunlight or simply due to external temperature variations) as well as changes in the external barometric pressure.

After a collision has occurred, thereby operating the pneumatic sensor 400 and pneumatic switch 420, the central control module 300 receives input from the pneumatic switch 420. The central control module 300 then automatically switches the powered mobility vehicle 10's power off and/or applies the vehicle's brakes to prevent collision damage from occurring. At the same time, the control module input/output interface displays a number of things: first, the reset switch LED 328 is lighted intermittently, causing it to blink on and off, and second, the directional instruction LED 332 corresponding to the sensor registering a collision is also intermittently lighted, causing it to blink on and off, thereby signifying that there is contact between the corresponding sensor and an object. The user must then press the reset switch 326 in order to restore power to the powered mobility vehicle 10. Upon activating the reset switch 326, the reset switch LED 328 is turned off, power to the vehicle 10 is restored, and the unprotected ready-to-move LED 330 is lit, indicating to the user that the vehicle is ready to move with the shutdown system deactivated and that corrective action is needed as indicated by the appropriate directional information LED 332. Furthermore, upon activation of the reset switch 326, the central control module 300 starts an internal, adjustable timer which provides a delay period for the user to take corrective action as indicated by the input/output interface 320. At the end of the delay period, the system automatically resets itself, and the ready-to-move LED 330 and the directional information LED 332 both turn off.

It will be understood that the system 100 is intended to be mounted to a powered mobility vehicle 10 through the use of existing bolts as much as possible in order to minimize, and preferably to eliminate, any modifications to the vehicle 10. This is desirable so as to avoid voiding any warranties. Ideally, the only modification necessary is the addition of an electrical interface to the standard user steering control module 30 to power the central control module 300. It will be further readily apparent that the particular input/output interface 320 as described, with the automatic reset timer, are designed to avoid operator confusion or frustration which would cause the operator to disable the system.

Those familiar with the art will understand the components of the invention, their methods of manufacture, and the methods of connecting them to form the complete Invention. While the preferred embodiment has been described, it will furthermore be understood that various changes can be made therein without departing from the spirit and scope of the invention.

CATALOGUE OF ELEMENTS

10 Powered mobility vehicle
20 Seat
22 Footrest

24 Armrests
30 User steering control module
40 Main power wheels
42 Rear steering wheels
44 Forward wheels
50 Body with motor
100 Collision damage prevention system
200 Sensors
202 Sensor support framework
300 Central control module
310 Control module circuitry
312 Control module circuit board
320 Control module input/output interface
322 System on/off switch
324 System on/off LED
326 Reset switch
328 Reset LED
330 Ready-to-move LED
332 Directional instruction LED
400 Pneumatic sensor
410 Rubber bumper
412 Bumper end cap
414 Set screw
416 Hollow set screw
418 Pneumatic cavity
420 Pneumatic switch
422 Switch body
424 Switch diaphragm
426 Switch actuator plate
430 Connecting tubing
432 Capillary tubing

The invention claimed is:

1. A method for preventing damage resulting from a collision between a powered mobility vehicle and an object comprising:

a. detecting said collision;

b. stopping said powered mobility vehicle using shutdown means;

c. displaying information about said collision on a user interface, wherein said information comprises the fact that said collision has occurred and the location of said collision;

d. prompting the user of said powered mobility vehicle to move said powered mobility vehicle away from said object; and e. displaying directions on how to move said powered mobility vehicle away from said object to said user on said user interface; and f. automatically resetting said shutdown means after a preset time interval.

* * * * *